E. F. Hamann.
Barometer.
Nº 30,061.  Patented Sep. 18, 1860.
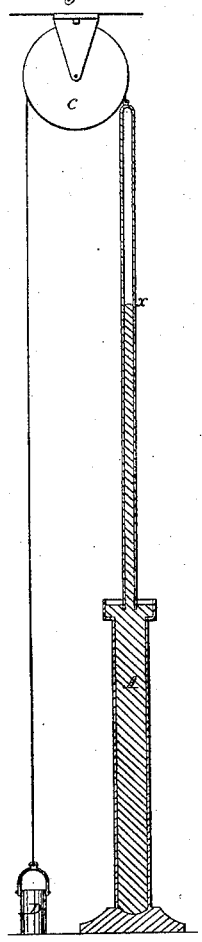
Fig. 1.
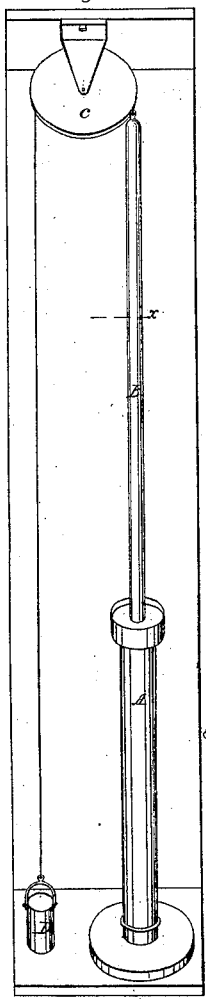
Fig. 2.
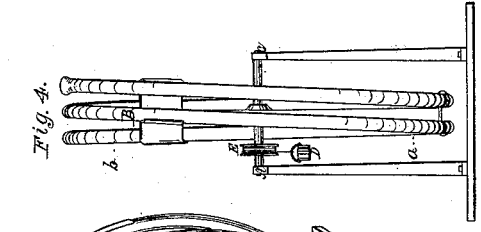
Fig. 5.
Fig. 4.
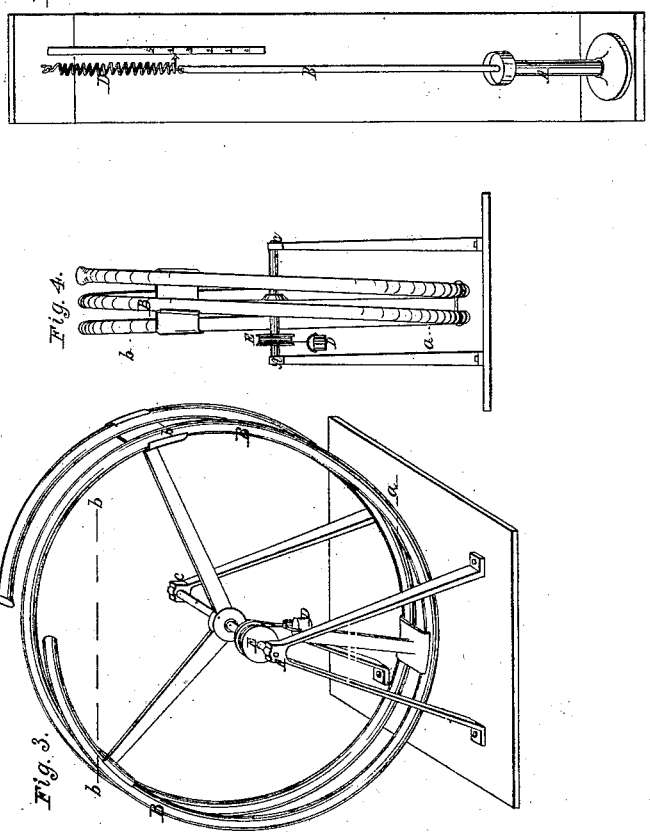
Fig. 3.
Witnesses:
Henry Kutsch
Louis Mayer
Inventor:
Emanuel Ferdinand Hamann

UNITED STATES PATENT OFFICE.

EMANUEL FERDINAND HAMANN, OF COLLIKOON, NEW YORK.

BAROMETER.

Specification of Letters Patent No. 30,061, dated September 18, 1860.

*To all whom it may concern:*

Be it known that I, EMANUEL FERDINAND HAMANN, of Collikoon, in the county of Sullivan and State of New York, have invented, made, and applied to use a certain new and useful Improvement in Barometers or Gages Moved by Atmospheric Pressure; and I do hereby declare that the following is a full, clear, and exact description of the construction and operation of the same, reference being had to the annexed drawing, making part of this specification, wherein—

Figure 1, is a vertical section of said instrument. Fig. 2 is a perspective view. Fig. 3, is a perspective view of the same instrument arranged in a circular form and Fig. 4, is an edge view of the same.

Similar marks of reference denote the same parts.

In the ordinary barometer the usual atmospheric changes produce comparatively little motion and hence the instrument is not sufficiently sensitive.

The nature of my said invention consists in balancing the column of mercury in such a manner that a large amount of motion will be produced with but little atmospheric change; the motion thus obtained is primarily an indicator of atmospheric variation, but on account of the extended movement may be applied to move a dial or index, or perform any other operation to which the apparatus may be adapted.

In the drawing A, is a vessel containing mercury and B is a tube immersed in the same, which tube B is hermetically sealed at one end and the air entirely exhausted and said tube is to be longer than the height of column that can be sustained by the pressure of atmosphere. A cord from the end of this tube B passes over a pulley C, that is fitted to revolve with as little friction as possible and D is a counter weight. We will now suppose the tube drawn up as represented in Fig. 1. The weight D to sustain the same must equal the weight of the tube together with the weight of the mercurial column, *i. e.*, the pressure of atmosphere tending to force the tube B down into A, in consequence of the vacuum within it. If now the pressure of air increases the weight D is overcome and the tube B descends until either the column of mercury reaches the upper end, or the tube B reaches the lower end of A, or the floating power of the mercury sustains the tube itself sufficient to compensate the difference of atmospheric pressure. Hence if the tube B is very thin and of heavy metal the range of motion will be greater than when thicker or of lighter material. This however may be compensated by forming the upper part of B slightly larger so as to contain more mercury and so balance the floating power in consequence of the displacement of the mercury by the tube. It will now be seen that the effective force to move the apparatus is the difference of atmospheric pressure between that at the equilibrium of the apparatus and that at the change, said difference of pressure moving through the space to which the parts are limited; and this motion becomes a very accurate indicator of atmospheric changes which may be shown on an index, or the movement can be communicated to any apparatus desired.

Fig. 5, shows this device applied with a spring instead of the counterweight, this probably being the most convenient form for an ordinary barometer.

It will be evident that the tubes may be of glass, metal, or other material and a less quantity of mercury may be used by applying a rod or a small cylinder centrally in the apparatus and extending from the bottom of A, up into the tube B, above the mercury level. Of course this only displaces mercury, the heights of column being unaffected and renders the whole apparatus much lighter. When this central rod or cylinder is used the tube B, may be suspended from its upper end and the atmosphere will be sufficient to sustain the tube A, if made but little larger than the tube B, and when this tube A, is weighted so that the atmospheric pressure will just sustain it, the change of pressure will cause a motion the same as that before described of the tube B.

In Figs. 3, and 4, I have shown the same features arranged in a circular form. B, is a circular coil or helix hermetically sealed at one end, the other open. A, G, are standards carrying the arbor upon which the ring itself is perfectly balanced. E, is a pulley and D is a counterweight to a cord over said pulley E. Now if mercury is contained in the tube B, between the points *a*, and *b*, and the weight D, is just sufficient to balance this column the apparatus will remain stationary, but if the atmospheric pressure decreases the column of mercury descends and the weight D, having less to sustain revolves the coil, the mercury remaining quiescent, until the weight D, reaches some stop, or an equilibrium is again attained. If the pressure increases the mercury is forced in a surplus on the other side, the weight D, is overcome and the apparatus revolves, winding said weight up to its former position: there being vacuum on one end of the mercurial column and atmosphere on the other, that column maintains a given position, but is actually weight on one side or the other of the balancing point, either to overcome the weight D, or allow that weight to run down:

Having thus described my said invention what I claim and desire to secure by Letters Patent is—

A tube containing a column of mercury so balanced or equilibrated that the atmospheric changes produce a greater extent of movement in said tube than the actual change in the altitude of the column of mercury as set forth.

In witness whereof I have hereunto set my signature this fifteenth day of August 1860.

EMANUEL FERDINAND HAMANN.

In presence of—
HENRY DEUTSCH,
LOUIS MAYER.